United States Patent [19]

Lipsztajn

[11] Patent Number: 4,773,975
[45] Date of Patent: Sep. 27, 1988

[54] ELECTROCHEMICAL REMOVAL OF HYPOCHLORITES FROM CHLORATE CELL LIQUORS

[75] Inventor: Marek Lipsztajn, Rexdale, Canada

[73] Assignee: Tenneco Canada Inc., Islington, Canada

[21] Appl. No.: 924,574

[22] Filed: Oct. 29, 1986

[51] Int. Cl.[4] .............................................. C25B 1/26
[52] U.S. Cl. ...................................... 204/95; 204/94; 204/103; 204/130
[58] Field of Search ................... 204/94, 95, 101, 103, 204/130

[56] References Cited

U.S. PATENT DOCUMENTS

| 3,102,085 | 8/1963 | Edwards et al. | 204/130 |
| 3,329,594 | 7/1967 | Anthony et al. | 204/95 |
| 4,222,833 | 9/1980 | Carlson | 204/128 |

FOREIGN PATENT DOCUMENTS

| 590810 | 1/1960 | Canada | 204/95 |

Primary Examiner—T. Tung
Attorney, Agent, or Firm—Sim & McBurney

[57] ABSTRACT

Hypochlorite present in cell liquor or other aqueous chlorate solution is reduced electrolytically in the presence of dischromate using a high surface area cathode having a three-dimensional electrolyte-contacting surface. An electrode potential more positive than $-1$ volts vs. SCE is applied to the cathode.

15 Claims, 1 Drawing Sheet

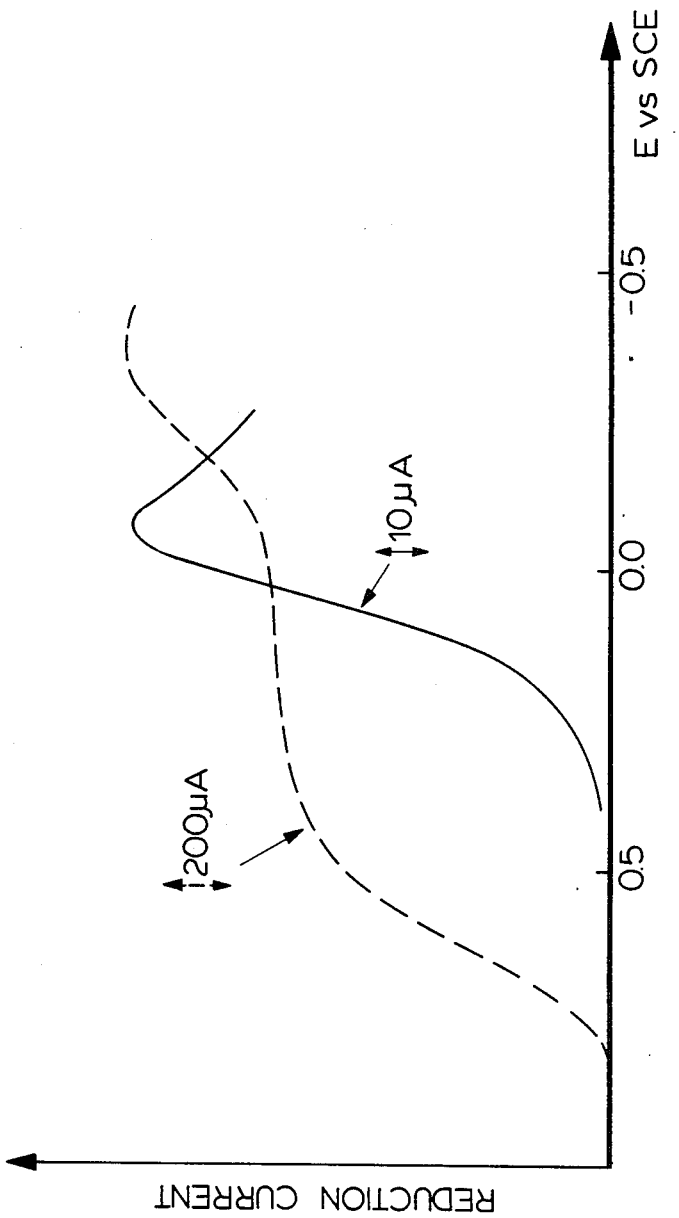

ELECTROCHEMICAL REMOVAL OF HYPOCHLORITES FROM CHLORATE CELL LIQUORS

FIELD OF INVENTION

The present invention relates to the treatment of cell liquors from the electrolytic production of chlorates.

BACKGROUND TO THE INVENTION

Chlorates are produced electrolytically by the electrolysis of an aqueous solution of the corresponding chloride in a diaphragmless cell between anode and cathode electrodes. Sodium chlorate is the most common product produced by such process. The process involves the intermediate formation of hypochlorite ions ($OCl^-$) which undergo decomposition to the chlorate ion ($ClO_3^-$).

Hexavalent chromium ions, usually introduced in the form of sodium dichromate, are present in the cell to prevent the reduction of the hypochlorite ions at the cathode, and the consequent loss of efficiency which otherwise would result. As a result, however, the sodium chlorate solution contains small amounts of hypochlorite ions, which need to be removed before the sodium chlorate solution enters the crystallizer, wherein sodium chlorate is recovered in crystalline form, or a storage area for later shipment as cell liquor.

The removal of hypochlorite, commonly termed "dehypoing", usually is effected by heating the cell liquor in a dehypo tank to remove the bulk of the hypochlorite by conversion to chlorate, with further removal being effected by treatment of the heated solution with urea or similar chemical. The chemical dehypoing process is time consuming, which introduces storage problems and capital expenditure. In addition, there have been reports of explosions when urea has been used.

SUMMARY OF INVENTION

The present invention provides a novel dehypoing process which permits electrolytically-produced aqueous chlorate solutions, usually sodium chlorate, to be dehypoed continuously. The invention is based on the surprising discovery that hypochlorite ions may be reduced electrochemically to harmless chloride ions despite the potential inhibitive action of the dichromate ions which are present.

In accordance with the present invention, there is provided a method of removing hypochlorite ("hypo") from an aqueous chlorate solution formed by electrolysis of an aqueous solution of a corresponding chloride in the presence of hexavalent chromium and which produces hypochlorite as a by-product, which comprises reducing the hypochlorite to chloride ions using a cathode polarized with an electrode potential more positive than $-1$ volt as compared with a saturated calomel electrode (SCE) and more negative than the open circuit potential under the prevailing conditions. Removal of hypochlorite usually is substantially completely effected, although any desired residual concentration may be achieved, depending on the length of time for which the electrolytic treatment is effected.

BRIEF DESCRIPTION OF DRAWING

FIG. 1 is a graphical representation of the voltammetric reduction of Cr(VI) and "hypo".

GENERAL DESCRIPTION OF INVENTION

As noted earlier, it is common practice to add hexavalent chromium ions to the brine feed to a chlorate cell, so as to inhibit electrochemical reduction of hypochlorite at the cathode. The mechanism whereby the hexavalent chromium inhibits cathodic electrochemical reduction of hypochlorite is thought to involve electrochemical reduction of the hexavalent chromium to trivalent chromium, which then deposits on the cathode as chromium hydroxide and significantly decreases the reduction current of non-cationic species, for example, hypo. The product cell liquor contains the hexavalent chromium ions. Removal of hypochlorite from the product cell liquor by electrochemical means, therefore, would not appear to be viable.

However, the inventor has found that if the electrode potential applied to a cathode is more positive than $-1$ volt vs. SCE and more negative than the open circuit potential, then rapid and efficient cathodic electrochemical reduction of hypochlorite can be effected in the presence of dissolved hexavalent chromium. The reason that this does not occur in the chlorate cell and the chromium inhibits hypochlorite electrolysis is that the cathode potential is much more negative in the chlorate cell. The open circuit potential under a prevailing set of conditions varies, depending on the pH of the aqueous solution and the concentrations of hypochlorite and hexavalent chromium ions in the aqueous solution.

The process is most advantageously carried out under mildly acid pH conditions, usually in the range of about 4 to about 7, whereat the hypochlorite exists mainly as HOCl.

The electrode employed as the cathode preferably is one having a high surface area and a three-dimensional electrolyte-contacting surface. The term "high surface area" in relation to the cathode refers to an electrode of the type wherein the electrolyte is exposed to a large surface area of electrode surface in comparison to the physical dimensions of the electrode. The electrode is formed with interstices through which the electrolyte flows, and so has a three-dimensional surface of contact with the electrolyte.

When employing a high surface area three-dimensional electrode, the electrode potential of $-1$ volt required herein is the solution potential at the feeder to the three-dimensional electrode.

The high surface area cathode used in this invention may be the so-called "flow through" type, wherein the electrode is formed of electroconductive porous material, for example, layers of electroconductive cloth, and the electrolyte flows through the porous structure while being subjected to electrolysis, and thereby is exposed to the high surface area of the mesh of the electrode.

The high surface area cathode used in this invention also may be the so-called "flow by" type, wherein the electrode comprises a packed bed of individual electroconductive particles and the electrolyte flows through the packed bed while being subjected to electrolysis, and thereby is exposed to the high surface area of the electroconductive particles in the packed bed.

The high surface area of the cathode permits the electrolyte to contact the cathode for an extended period of time.

This extended period of contact results in rapid reduction of the hypochlorite to chloride ions. The reduction of hypochlorite may be selective, that is, hypochlorite is removed while the hexavalent chromium remains electrolytically substantially unaffected, or, simultaneous with the reduction of hypochlorite, hexavalent chromium is electrolytically reduced to trivalent chromium which deposits on the electrode surface as chromium hydroxide, depending on the conditions of operation and the nature of the electrode employed.

As is well known to those skilled in the electrochemical art, the overpotential of an electrode towards the electrochemical reaction $Cl_2 \rightarrow Cl^-$ refers to the relationship of the potential applied to the electrode to the equilibrium potential to sustain the electrochemical reaction at a reasonable rate. If the electrode potential is close to the equilibrium potential, then the electrode is considered to have a "low" overpotential while, if a much more negative potential is required to achieve the practical reduction rate, then the electrode is considered to have a "high" overpotential.

In the case where the cathode has an electroconductive surface formed of a material which has a low overpotential to the electrochemical reaction $Cl_2 \rightarrow Cl^-$, selective electrolytic removal of hypochlorite is possible at an applied electrode potential of approximately 0.5 volts vs. SCE. Such low overpotential materials are known and are used to construct the so-called "dimensionally-stable" electrodes. Such electrodes usually comprise a substrate formed of titanium, zirconium, tantalum or hafnium, with an electroconductive coating of a precious metal, for example, platinum; a precious metal alloy, for example, a platinum-iridium alloy; a metal oxide, for example, ruthenium oxide; mixtures of two or more of such materials; or a platinate, for example, lithium platinate or calcium platinate. Any of such electroconductive materials may be employed to provide the electroconductive surface. A platinum surface typically has an overpotential to the $Cl_2/Cl^-$ reaction of about 40 mV. Other suitable electrode materials also can be used.

In the case where the cathode has an electroconductive surface formed of a material which has a high overpotential toward the electrochemical reaction $Cl_2/Cl^-$, for example, carbon which has an overpotential of 0.5V, a more negative potential is required, approximately 0 volts vs. SCE, at which potential electrolytic reduction of both hypochlorite and hexavalent chromium occurs.

Electrochemical reduction of hexavalent chromium to trivalent chromium, which precipitates on the surface of the cathode as chromium hydroxide, occurs at a much lower rate than electrochemical reduction of hypochlorite and, with the high surface area available for deposition of the trivalent chromium, sufficient exposed cathode sites remain to enable the hypochlorite reduction to be effected.

The specific surface areas and conditions of operation of the electrolytic cell depend on the concentrations of hypochlorite and dichromate present and the physical form of the electrode. Depending on cell capacity, the electrolyte may be circulated a number of times through the high surface area cathode to remove the hypochlorite.

For a packed bed cathode using electroconductive particles, the surface area usually varies from about 50 to about 500 sq.cm/cc, preferably about 100 to about 200 sq.cm/cc.

The flow rate of catholyte in contact with the high surface area cathode may vary widely and generally the linear catholyte flow rate is about 10 to about 1000 cc/min. Faster flow rates lead to a more rapid removal rate with respect to hypochlorite.

In addition to electrochemical removal of hypochlorite in the method of the present invention, some hypochlorite is removed by chemical reaction with the electrochemically-deposited chromium hydroxide, thereby forming chlorides from the hypochlorite and Cr(VI) from the Cr(III).

The electrolytic cell in which the hypochlorite removal is effected in accordance with this invention may have any desired construction consistent with the requirement that the cathode have a high surface area, so as to provide a long flow path for the catholyte in contact with a three-dimensional network of electrode surface.

The cell may be provided with a separator, for example, an ion-exchange membrane, usually a cation-exchange membrane, separating the anode compartment from the cathode compartment, so as to prevent interaction of gases produced at the anode and the electroreduction at the cathode. With a divided cell, fresh brine may be fed to the anodic compartment with the effluent therefrom then passing to the chlorate cells.

The anode of the cell may be constructed of any desired material, for example, graphite or metal. For a membrane-divided cell, the anolyte may be any desired electrolyte and typically comprises an acidic medium. The flow rate of anolyte through the anode compartment may vary widely and typically is about 10 to about 1000 cm/min.

The hypochlorite-contaminated sodium chlorate solution is passed through the cathode compartment, wherein the hypochlorite ions are cathodically reduced to chloride ions and hydroxyl ions, resulting in an increased pH. Acid may be added, intermittently or continuously, to control the pH in the catholyte within the required range, preferably in the range of about 5.5 to 6.5. The temperature of the electrolytic process is not critical, although higher removal rates of hypochlorite occur at high temperatures.

The voltage which is applied between the anode and cathode to provide the desired electrode potential depends on the materials of construction of the cathode and anode as well as cell design but generally is less than about 2 volts.

The hypochlorite concentration of the cell liquor, generally ranging from about 0.1 to about 5 g/L, preferably about 0.3 to about 1.5 g/L, is rapidly decreased to below 0.05 g/L. The rapid nature of the electrolytic reduction enables the hypochlorite to be reduced continuously and on line, hence eliminating the need for chemical addition and long term reactions and storage

EXAMPLES

Example 1

Voltammetric studies were effected on two different aqueous solutions having a pH of about 6.5, namely one containing about 1.3 g/L of hypochlorite and about 1.5 g/L of sodium dichromate and a second aqueous solution containing no hypochlorite and about 8 g/L of sodium dichromate, using a platinum disc electrode having a surface area of 0.196 cm$^2$. The reduction current was plotted against the applied potential for each solution and the results are reproduced as FIG. 1.

It will be seen from this data that the potential at which hypo reduction occurs is quite different from that at which chromium (VI) reduction occurs with the low overvoltage platinum material. It is also seen that the rate of reduction (i.e. a reduction current) is about 100 times higher for hypo than for chromium (VI).

EXAMPLE 2

A series of experiments was conducted using an electrolytic cell dimensioned 2"×2.5×2" (depth) and divided into an anode compartment (of volume approximately 0.015 dm$^3$) and a cathode compartment (of volume approximately 0.5 dm$^3$) by a cation-exchange membrane of the "NAFION" (trademark of Du Pont) type. The cathode compartment was packed with graphite particles ("UCAR A-20" (trademark of Union Carbide Corporation)) of mean diameter 1.5 mm. The anode was platinized titanium. Current was provided to the cathode bed by means of a graphite plate distributor.

The cathode compartment was fed with an aqueous cell liquor containing 600 g/L sodium chlorate, 100 g/L sodium chloride and a varying concentration of hypochlorite up to 2 g/L. Sodium dichromate also was present in a concentration of 3.0 g/L. The flow rate of catholyte was varied between 30 and 120 mL/min. The temperature of the catholyte was varied between 25° and 60° C. Most experiments were conducted with the pH of the catholyte maintained in the 5.5 to 6.5 region by the addition of 1N HCl. The anode compartment was fed with brine having a concentration of 150 g/L at a flow rate of 80 mL/min.

The electrolyses were carried out in an approximately constant voltage mode using a standard current supply equipment (Hewlett Packard 6024 A DC power supply). The voltage was usually varied in the 1.8 to 2.0V range. The corresponding current was in the 2 to 4A range (giving a superficial current density of 200 to 400A/m$^2$.

During the experiments, samples of catholyte were frequently taken and analyzed for hypo content using the standard arsenite method. The results of the tests conducted are set forth in the following Table 1:

TABLE 1

ELECTROLYTIC REMOVAL OF HYPO FROM THE CHLORATE CELL LIQUOR

| EXPT. NO. | TEMP. [°C.] | FLOW RATE [mL/min] | TIME [min] | CURRENT [Amps] | CONC. OF NaOCl [g/L] |
|---|---|---|---|---|---|
| 1 | 25 | 85 | 0 | 1.5 | 1.72 |
|   |    |    | 45 | 0.2 | 0.00 |
| 2 | 40 |    | 0 | 3.0 | 1.70 |
|   |    | 85 | 10.5 | 0.51 | 0.08 |
|   |    |    | 14.0 | 0.42 | — |
|   | 25 |    | 17.5 | 0.34 | 0.00 |
| 3 | 60 |    | 0 | 3.88 | 1.64 |
|   |    |    | 3.5 | 2.38 | 0.54 |
|   |    | 85 | 8.0 | 1.06 | 0.25 |
|   |    |    | 14.0 | 0.50 | 0.10 |
|   |    |    | 24.0 | 0.42 | 0.05 |
|   | 25 |    | 27.0 | 0.39 | 0.00 |
| 4 | 60 |    | 0 | 3.72 | 1.63 |
|   |    |    | 5.5 | 0.97 | 0.82 |
|   |    |    | 11.0 | 0.78 | 0.59 |
|   |    | 30 | 16.0 | 0.64 | 0.31 |
|   |    |    | 24.0 | 0.53 | 0.20 |
|   |    |    | 33.0 | 0.45 | 0.22 |
|   | 25 |    | 67.0 | 0.32 | 0.08 |
| 5 |    |    | 0 | 3.48 | 0.95 |
|   |    |    | 3.5 | 1.21 | 0.20 |
|   | 60 | 85 | 7.0 | 0.73 | 0.19 |
|   |    |    | 12.0 | 0.61 | 0.08 |
|   |    |    | 15.0 | — | 0.00 |
| 6 |    |    | 0 | 3.4 | 0.75 |
|   |    |    | 3.5 | 1.10 | 0.10 |
|   | 60 | 122 | 6.5 | 0.76 | 0.07 |
|   |    |    | 16.0 | 0.63 | 0.05 |
| 7 |    |    | 0 | 4.31 | 0.77 |
|   |    |    | 3.5 | 1.52 | 0.19 |
|   | 60 | 122 | 7.0 | — | 0.03 |
|   |    |    | 11.0 | 0.75 | 0.00 |
|   |    |    | 14.0 | 0.71 | 0.00 |

As may be seen from the results in Table 1, hypochlorite can be rapidly removed from chlorate cell liquor by electrolysis. Both high temperature and flow rate generally have a beneficial effect on the hypo removal process.

SUMMARY OF DISCLOSURE

In summary of this disclosure, the present invention provides a novel process of removing hypochlorite from cell liquor containing sodium dichromate. The hypo removal is effected rapidly and electrolytically, enabling on-line continuous processing to be effected. Modifications are possible within the scope of this invention.

What I claim is:

1. A method for treating an aqueous chlorate solution containing hypochlorite and hexavalent chromium, said aqueous chlorate solution being formed by an electrolysis of an aqueous solution of corresponding chloride in the presence of hexavalent chromium and which produces hypochlorite as a by-product, which comprises electrolytically reducing hypochlorite contained in said aqueous chlorate solution to chloride ions using a cathode polarized with an electrode potential more positive than −1 volt as compared with a saturated calomel electrode (SCE) and more negative than the open circuit potential under the prevailing conditions, said cathode being in the form of a high surface area cathode having a three-dimensional electrolyte-contacting surface with interstices through which the aqueous chlorate solution flows during said polarization by said electrode potential.

2. The method of claim 1, wherein said aqueous chlorate solution has a pH of about 4 to about 7.

3. The method of claim 1 wherein said high surface area electrode is constructed of a material having a low overpotential to the electrochemical reaction $Cl_2 \rightarrow Cl^-$ and said electrode potential is at a value such that said hypochlorite is removed while said hexavalent chromium remains electrolytically substantially unaffected.

4. The method of claim 3 wherein said high surface area electrode has a surface constructed of an electroconductive metal, alloy or compound thereof.

5. The method of claim 3 wherein said electrode potential is approximately +0.5 volts vs. SCE.

6. The method of claim 1 wherein said high surface area electrode is constructed of a material having a high overpotential to the electrochemical reaction $Cl_2 \rightarrow Cl^-$ and said electrode potential is at a value such that said hexavalent chromium is electrolytically reduced to trivalent chromium and is deposited on the electrode surface while the hypochlorite is removed.

7. The method of claim 6 wherein said high surface area electrode has a surface constructed of carbon.

8. The method of claim 6 wherein said electrode potential is approximately 0 volts vs. SCE.

9. The method of claim 1 wherein a substantially constant voltage is applied between the cathode and an anode during said electrolytic reduction.

10. The method of claim 9 wherein the applied voltage between the anode and the cathode is less than about 2 volts.

11. The method of claim 10 wherein the aqueous solution has a pH of no more than about 7.

12. The method of claim 1 wherein said cathode is located in a cell having a membrane separating an anode compartment from a cathode compartment.

13. The method of claim 1 wherein said aqueous chlorate solution contains about 0.1 to about 5 g/L of hypochlorite and the concentration is decreased to below 0.05 g/L.

14. The method of claim 13 wherein said aqueous chlorate solution contains about 0.3 to about 1.5 g/L of hypochlorite and the concentration is decreased to below 0.05 g/L.

15. The method of claim 13 wherein said aqueous solution which is electrolyzed is sodium chloride and said aqueous chlorate solution formed by the electrolysis is an aqueous solution of sodium chlorate and sodium chloride.

* * * * *